United States Patent
Bertolotti

(10) Patent No.: US 9,127,645 B2
(45) Date of Patent: Sep. 8, 2015

(54) METHOD FOR CONTROLLING A WIND TURBINE

(75) Inventor: Fabio Bertolotti, Bad Bentheim (DE)

(73) Assignee: SSB Wind Systems GmbH & Co. KG, Salzbergen (DE)

( * ) Notice: Subject to any disclaimer, the term of this patent is extended or adjusted under 35 U.S.C. 154(b) by 792 days.

(21) Appl. No.: 13/390,197

(22) PCT Filed: Jul. 11, 2010

(86) PCT No.: PCT/EP2010/059948
§ 371 (c)(1), (2), (4) Date: Feb. 13, 2012

(87) PCT Pub. No.: WO2011/018284
PCT Pub. Date: Feb. 17, 2011

(65) Prior Publication Data
US 2012/0139248 A1  Jun. 7, 2012

(30) Foreign Application Priority Data
Aug. 14, 2009  (DE) .......................... 10 2009 026 372

(51) Int. Cl.
*F03D 7/04* (2006.01)
*F03D 7/02* (2006.01)

(52) U.S. Cl.
CPC ............ *F03D 7/0292* (2013.01); *F03D 7/0204* (2013.01); *F03D 7/0224* (2013.01);
(Continued)

(58) Field of Classification Search
CPC ... Y02E 10/723; Y02E 10/721; F03D 7/0204; F03D 7/0224; F03D 7/024; F03D 7/0272; F05B 2270/321; F05B 2270/328; F05B 2270/331
USPC .......... 415/4.2, 4.5, 118, 126, 908; 416/9, 18, 416/61; 290/44, 55
See application file for complete search history.

(56) References Cited

U.S. PATENT DOCUMENTS 4,298,313 A * 11/1981 Hohenemser .................. 416/98
8,162,608 B2 * 4/2012 Birkemose et al. ............ 416/31
(Continued)

FOREIGN PATENT DOCUMENTS

DE 197 39 162 A1 3/1999
EP 0 995 904 A2 4/2000
EP 2 037 119 A1 3/2009

OTHER PUBLICATIONS

International Search Report (in German with English translation) and Written Opinion (in German) for PCT/EP2010/059948, mailed Jan. 3, 2011; ISA/EP.

(Continued)

*Primary Examiner* — Nathaniel Wiehe
*Assistant Examiner* — Eldon Brockman
(74) *Attorney, Agent, or Firm* — Harness, Dickey & Pierce, P.L.C.

(57) ABSTRACT

The invention relates to a method for controlling a wind power plant having a rotor (5) driven by wind and rotating about a horizontal or substantially horizontally aligned rotor axis (6). The rotor includes a plurality of rotor blades (1, 2, 3), each extending in the direction of a blade axis (11, 12 13) which is perpendicular or substantially perpendicular to the rotor axis and about which the respective rotor blade (1, 2, 3) is rotated, wherein the rotor (5) is rotated about a vertical or substantially vertically aligned yaw axis (8) having a yaw angle velocity (γ), whereby gyroscopic loads are generated on the rotor blades (1, 2, 3), and wherein the gyroscopic loads on the rotor blades (1, 2, 3) are reduced by rotating the rotor blades (1, 2, 3) about the blade axes (11, 12, 13) thereof depending on the yaw angle velocity (γ) or a guide variable (γc) influencing said velocity.

22 Claims, 6 Drawing Sheets

(52) U.S. Cl.
CPC ............ *F03D 7/042* (2013.01); *F05B 2260/70* (2013.01); *F05B 2270/1095* (2013.01); *F05B 2270/331* (2013.01); *Y02E 10/721* (2013.01); *Y02E 10/723* (2013.01)

(56) References Cited

U.S. PATENT DOCUMENTS

| | | | | |
|---|---|---|---|---|
| 2004/0151584 | A1* | 8/2004 | Blakemore | 416/9 |
| 2007/0057517 | A1* | 3/2007 | McNerney | 290/44 |
| 2008/0101930 | A1* | 5/2008 | Bosche | 416/31 |
| 2009/0068013 | A1* | 3/2009 | Birkemose et al. | 416/31 |
| 2011/0285129 | A1* | 11/2011 | Li et al. | 290/44 |

OTHER PUBLICATIONS

English Translation of the International Preliminary Report on Patentability (Chapter I of the Patent Cooperation Treaty) for PCT/EP2010/059948, issued Feb. 14, 2012.

* cited by examiner

Fig. 6
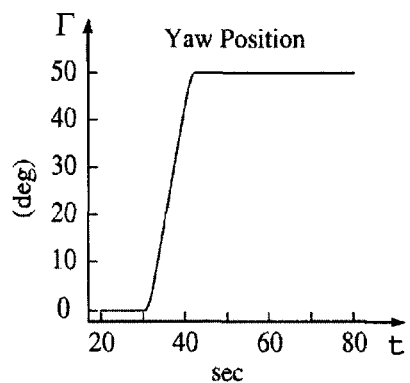
Fig. 7
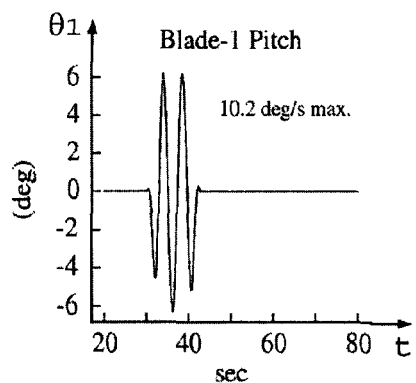
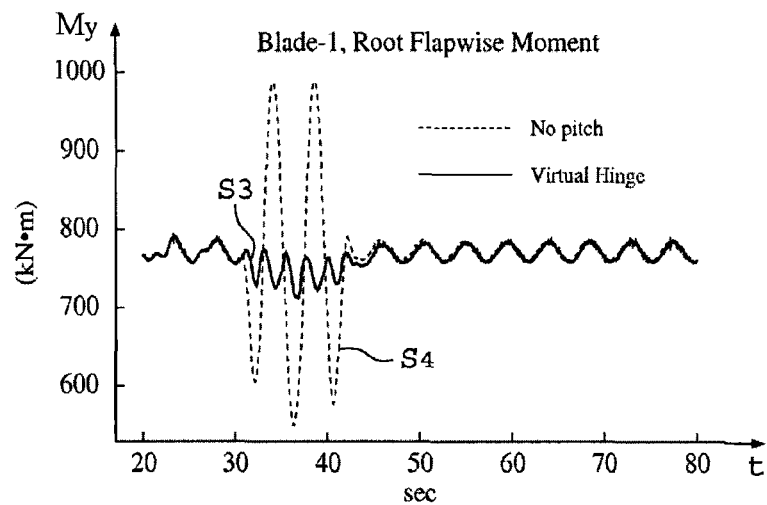
Fig. 9

METHOD FOR CONTROLLING A WIND TURBINE

CROSS-REFERENCE TO RELATED APPLICATIONS

This application is a 371 U.S. National Stage of International Application No. PCT/EP2010/059948, filed Jul. 11, 2010, and claims priority to German Patent Application No. 10 2009 026 372.1 filed Aug. 14, 2009, the disclosures of which are herein incorporated by reference in their entirety.

FIELD

The invention relates to a method for controlling a wind turbine comprising a rotor which is wind-driven, rotates about a horizontally or substantially horizontally aligned rotor axis and comprises a plurality of rotor blades which each extend in the direction of a blade axis running transversely or substantially transversely to the rotor axis, about which the respective rotor blade is rotated, the rotor being rotated about a vertically or substantially vertically aligned yaw axis at a yaw angular velocity, as a result of which gyroscopic loads are generated on the rotor blades. The invention also relates to a wind turbine comprising a rotor which can be driven by wind, can rotate about a horizontally or substantially horizontally aligned rotor axis and comprises a plurality of rotor blades which each extend in the direction of a blade axis running transversely or substantially transversely to the rotor axis, a yaw angle adjusting drive by which the rotor can be rotated about a vertically or substantially vertically aligned yaw axis at a yaw angular velocity, gyroscopic loads being generated on the rotor blades due to the rotation of the rotor about the yaw axis, and comprising blade angle adjusting drives by which the rotor blades can be rotated about their blade axes.

BACKGROUND

Modern wind turbines which are capable of delivering a plurality of megawatts of electric power and which are also known as multi-megawatt turbines comprise rotor blades which are rotatably mounted on a rotor so that by changing the blade angle relative to the rotor, the angle of incidence of the wind can be varied for each rotor blade.

According to a first method for operating a wind turbine, a single blade angle error is delivered to all rotor blade control means so that a common change in the angle of all the rotor blades takes place. On the other hand, according to a second method for operating a wind turbine, an individual blade angle control means is used, also known as IPC, so that the blade angles for each rotor blade are adjusted individually. In an ideal case, the use of an IPC can reduce the energy costs, since it is possible to either reduce the initial investment costs as a result of mass reduction of structural elements of the wind turbine or the annual energy production can be increased due to longer rotor blades.

However, the IPC is not a mature technology, but is the subject of ongoing developments. The objective of these developments is to reduce loads, arising temporarily on the rotor blades, due to shear stresses and wind turbulence. Known control strategies which use the IPC to reduce such loads are either based on the evaluation of load, expansion or acceleration signals obtained from one or a plurality of rotor blades or on the evaluation of deformations of the main shaft, supporting the rotor, of the wind turbine.

U.S. Pat. No. 6,361,275 B1 discloses an individual blade angle control means which is based on blade load sensors or on wind speed sensors on the blade surface, to reduce loads caused by local, temporary peaks of the wind speed in parts of the rotor region.

WO 01/33075 A1 describes an individual blade angle control means which is based on mechanical loads on the rotor blades in order to operate the wind turbine closer to its design limits, without exceeding these limits.

According to WO 2004/074681 A1, to improve the stability of the wind turbine, flow characteristics are measured locally in front of each rotor blade (for example by a long arm which extends away forwards from the blade and supports an anemometer), so that fatigue loads and the risk of rotor blade-tower interactions are reduced.

WO 2008/041066 A1 discloses an individual blade angle control means to reduce moments caused by wind shear and maladjustments of the yaw angle, the blade angle being controlled subject to measured moments acting on the rotor blades to reduce the difference of the measured moments from a set value (which is stored in a memory).

WO 2008/087180 A2 describes an individual blade angle control means for reducing asymmetric loads on the rotor, the blade angle being controlled subject to measured deformations of the main shaft (measurement using strain gauges).

U.S. Pat. No. 7,118,339 B2 discloses an individual blade angle control means and a yaw angle control means which are based on rotor blade load measurements and respectively on main shaft displacement measurements, so that the wind turbine is brought into a favourable alignment by yawing, the individual blade angle control means being used to reduce additional asymmetric rotor loads (i.e. fatigue loads). Furthermore, the operation of the wind turbine with a predetermined yaw angle error is disclosed to counteract asymmetric rotor loads.

WO 2008/119351 A2 describes an individual blade angle control means to generate a rotor moment which counteracts the moment of gravity so that the loads on the main shaft bearings are reduced.

The above-mentioned documents attempt to indirectly lower the energy costs by reducing the fatigue loads so that it is possible to reduce the structural loading capacity of the wind turbine (for example by reducing the weight). In order to be able to allow a reduction of the structural loading capacity, other loads such as extreme weather conditions to which the wind turbine is exposed during its service life also have to decrease. Otherwise, the advantages which can be achieved with the IPC are partly or completely lost. For these and other reasons, the IPC is currently not used on a commercial level.

Thus, there is a need for an IPC system which can reduce the energy costs and which can be used with a current wind turbine design with minimum modifications to the construction of the wind turbine.

Another field in connection with the operation of wind turbines but which is not the subject of the above-mentioned documents relates to the effect of yaw angle errors. The yaw angle error is defined as the angle between the wind direction and the rotor axis. However, the vertical component of the wind speed is not considered when determining the yaw angle error because the inclination of the rotor axis cannot be altered during operation of the wind turbine (an upwards incline of the rotor axis of, for example 5° is typical of commercial wind turbines). Therefore, to determine the yaw angle error, only the component, located in the horizontal plane, of the wind speed is considered. Yawing the rotor of the wind turbine can reduce the yaw angle error to zero (with constant wind conditions).

WO 2008/143009 A1 discloses an individual blade angle control means for generating forces which engage on the rotor blades and generate a yaw moment for yawing the wind turbine. It is thus possible to partly or completely dispense with yaw drives, thus making it possible to reduce electrical power losses. However, the availability of forces engaging on the rotor blades for generating the yaw moment is subject to the sporadic and stochastic nature of the wind, including the effect of turbulence, so that precise and timely yaw procedures are impossible. In order to achieve a controllable yaw movement based on these forces, the yaw movement is damped by a braking system during the entire yaw procedure. However, this damping significantly reduces the velocity of the yaw movement so that the friction forces of the braking system have to be overcome by increased, cyclic blade loads, which is detrimental to the service life of the wind turbine and is thus undesirable. Furthermore, the additional electrical power loss which is associated with the increased activity of the blade angle adjusting drive cancels out the advantages which are associated with the lower power loss of the yaw drive. Apart from this, when there is a lull in the wind, the wind turbine must be able to yaw to unravel cables, so that the desire to eliminate the electrical yaw system cannot be realised in practice.

Due to undesirable and damaging gyroscopic rotor blade loads which arise during yawing, the yaw rate of present commercial multi-megawatt wind turbines is below a value of 0.7°/s (in most cases even below 0.5°/s). These gyroscopic loads increase linearly with the yaw rate so that a restriction of the yaw rate also restricts the gyroscopic loads. The yaw rate is also called yaw angular velocity.

Detailed measurements of the yaw angle error on ready-for-use, commercial multi-megawatt wind turbines, as described, for example, in the report Risø-R-1654 (EN) by T. F. Pedersen, N. N Sørensen, L. Vita and P. Enevoldsen (2008) entitled "Optimization of Wind Turbine Operation By Use of Spinner Anemometer" show that the yaw angle error attains instantaneous values of more than 30°, and that deviations of up to 4°/s occur over a significant period of time. This angular velocity is significantly above the limit of 0.4°/s to 0.6°/s of current commercial multi-megawatt wind turbines. Consequently, current wind turbines cannot track the changes in wind direction and are continuously operated under significant yaw angle errors. Typical wind turbine control means allow a yaw angle error of approximately 25° to 30° when the yaw angle error is averaged over a period of 5 to 15 seconds, a yaw angle error of 10° to 15° when the yaw angle error is averaged over one minute and a yaw angle error of 3° to 6° when the yaw angle error is averaged over 10 minutes or more.

Thus, there is a need for a facility to be able to continuously operate modern multi-megawatt wind turbines with reduced or small yaw angle errors. Reducing the yaw angle error permits increased energy consumption if the wind turbine is operated below the nominal speed. Furthermore, a reduction in the yaw angle error reduces flexural loads on the rotor blades which are caused by asymmetric wind conditions over the area covered by the rotor if the wind turbine is operated above the nominal speed.

The prior art solutions which use individual blade angle control means based on blade loads or blade accelerations cannot be used successfully to reduce gyroscopic loads. On the one hand, wind turbulence causes changes in the blade loads and blade accelerations, thereby concealing the onset of gyroscopic loads. On the other hand, the gyroscopic blade loads lag (temporally) behind the blade angle adjustment due to the inertia of the rotor blades. In both cases, this leads to a delayed and ineffective blade angle adjustment with respect to the reduction of gyroscopic loads.

US 2009/0068013 A1 discloses a method for reducing loads which act on a yaw system of a wind turbine due to yaw moments, the yaw moments being introduced into the yaw system by a rotor which comprises a rotor blade with a blade angle adjusting system. The yaw moment introduced into the yaw system by the rotor is determined and, based on the ascertained yaw moment, a blade angle of the rotor blade is adjusted such that the determined yaw moment is reduced.

According to this method, it is not the gyroscopic loads, caused by a yaw procedure, of the individual rotor blades, but the moments which act around the yaw axis and engage on the yaw system which are reduced. In particular, aerodynamic loads of the yaw system are to be reduced as a result of rotating the rotor blades about their blade axes subject to a set value for the yaw moment.

SUMMARY

On this basis, an object of the invention is to provide a facility to be able to reduce, as quickly as possible, the yaw angle error in a wind turbine.

According to the invention, this object is achieved by a method according to claim 1 and by a wind turbine according to the present disclosure.

According to the present disclosure a method is provided for controlling a wind turbine comprising a rotor which is wind-driven, which rotates about a horizontally or substantially horizontally aligned rotor axis, and comprises a plurality of rotor blades which each extend in the direction of a blade axis running transversely or substantially transversely to the rotor axis, about which the respective rotor blade is rotated, the rotor is rotated about a vertically or substantially vertically aligned yaw axis at a yaw angular velocity, as a result of which gyroscopic loads are generated on the rotor blades and by rotating the rotor blades about their blade axes subject to the yaw angular velocity or to a guide variable influencing said yaw angular velocity, the gyroscopic loads on the rotor blades are reduced. The yaw angular velocity is the angular velocity at which the rotor is rotated about the yaw axis and is also termed the yaw rate.

Due to the rotation of the rotor blades about their blade axes subject to the yaw angular velocity or to the guide variable, it is possible to generate aerodynamic loads on the rotor blades which counteract the gyroscopic loads on the rotor blades caused by the yaw movement of the rotor. The aerodynamic loads are based on aerodynamic interactions between the wind and the rotor blades and depend on the angles at which the wind flows onto the rotor blades (angle of incidence). However, the angles of incidence can be varied by rotating the rotor blades about their longitudinal axes. Since, according to the invention, this rotation takes place subject to the yaw angular velocity or to the guide variable which influences the yaw angular velocity, the gyroscopic loads can be partly or completely compensated by the aerodynamic loads, so that the yaw angular velocity can be significantly increased compared to conventional wind turbines.

Thus, in particular gyroscopic loads of the rotor blades, which loads are generated by the rotation of the rotor about the yaw axis, are reduced by the rotation of the rotor blades about their blade axes subject to the yaw angular velocity or to the guide variable. This reduction can be partial or complete.

The aerodynamic loads are preferably forces and/or moments. Furthermore, the gyroscopic loads are preferably forces and/or moments.

Although in addition to describing the rotation of the rotor blades about their blade axes subject to a set value for the yaw moment, US 2009/0068013 A1 describes the rotation of the rotor blades about their blade axes subject to the yaw velocity, this is only in connection with a constant holding torque of a yaw drive or a constant holding friction of a friction brake. Consequently, the rotor should not rotate about the yaw axis, but should remain in its position, with the yaw drive only reacting to aerodynamic disturbance moments engaging on the yaw system. Therefore, gyroscopic loads of the rotor blades, which loads are generated by rotations of the rotor about the yaw axis, are relatively small, so that a reduction in these loads is not afforded or disclosed in US 2009/0068013 A1.

The yaw angular velocity is preferably controlled or regulated subject to the guide variable. In particular, the guide variable forms a set value for the yaw angular velocity.

Since the rotor blades rotate about the rotor axis, it is also possible for aerodynamic loads to arise on the rotor blades which are not suitable for compensating the gyroscopic loads. Loads of this type can additionally load the rotor and are undesirable. Thus, each rotor blade is preferably rotated about its blade axis additionally subject to an angle of rotation enclosed by the respective blade axis by a vertically or substantially vertically aligned straight line which in particular extends in the direction of the yaw axis. Each rotor blade is preferably rotated about its blade axis additionally subject to the cosine of an angle which is equal to the respective angle of rotation or is equal to a total of the respective angle of rotation and a phase shift for the respective rotor blade. The phase shift can be the same for all rotor blades or can vary from one rotor blade to another. Since the sine can be converted into the cosine by phase shift, the sine can also be used instead of the cosine, in particular considering the phase shift.

The rotor blades are preferably rotated about their blade axes additionally subject to a power which is delivered and/or is to be delivered by the wind onto the rotor. This procedure is also known as "pitching". In particular, pitching controls or regulates the power. It is thus possible to continue operating the wind turbine in a normal manner during yawing which takes place at a high yaw rate due to the simultaneous generation of the aerodynamic loads. In particular, the rotation of the rotor blades subject to the power is preferably additively superimposed on the rotation of the rotor blades to reduce the gyroscopic loads.

The direction in which the wind flows onto the rotor is preferably measured. Furthermore, a yaw angle by which the rotor is rotated about the yaw axis is measured. In particular, determined from the wind direction and the yaw angle is a yaw angle error which describes an angular difference between the direction of the rotor axis and the wind direction. The yaw angle error is defined, for example, as the angle between the direction of the rotor axis and the wind direction. However, the rotor axis is usually slightly inclined upwards with respect to the horizontal and this incline cannot generally be changed during operation of the wind turbine. Thus, the yaw angle error preferably corresponds to an angle which is enclosed between a projection of the direction of the rotor axis onto a horizontal or a substantially horizontal plane and the wind direction or a projection of the wind direction onto this plane. The plane extends in particular vertically to the yaw axis. In the case of rotors with a large diameter, the wind direction can vary locally, so that the wind direction can also be a resulting or locally averaged wind direction in the region of the rotor or can be a wind direction which is recorded at a defined location in the region of the rotor.

The guide variable is determined in particular. The guide variable is preferably determined subject to the yaw angle error and/or to the yaw angle error rate. In particular, the guide variable is proportional to or linearly dependent on the yaw angle error rate which is defined as a temporal derivation of the yaw angle error. A maximum threshold value is preferably defined which is not exceeded by the guide variable, so that it is possible to avoid an overload of the wind turbine.

The yaw angular velocity is in particular measured or determined on the basis of a measurement of the rotational movement of the rotor about the yaw axis.

Rotations of the rotor blades about their blade axes are in particular described in each case by a blade angle and/or by the change thereof. Thus, the rotor blades preferably rotate as a result of controlling or regulating the blade angles subject to the yaw angular velocity or to the guide variable. According to a configuration of the invention, a desired blade angle which is subject to the yaw angular velocity or to the guide variable is determined for each rotor blade, said blade angle for each rotor blade being controlled or regulated subject to the respective desired blade angle. In particular, each desired blade angle forms a set value for the blade angle of the respective rotor blade. The blade angle of each rotor blade is preferably measured.

Each of the desired blade angles is preferably linearly dependent on the yaw angular velocity or on the guide variable. In particular, each of the desired blade angles is formed by a total of a plurality of summands, one of which is dependent on, in particular is linearly dependent on or is proportional to the yaw angular velocity or the guide variable. This one summand is preferably also dependent on the rotational speed of the rotor or on the rotor angular velocity and/or on the wind speed and/or on the angle of rotation of the respective rotor blade enclosed by the blade axis thereof with a vertically or substantially vertically aligned straight line which extends in particular in the direction of the yaw axis. Thus, this one summand forms a compensation term for generating the aerodynamic loads, by which the gyroscopic loads are partly or completely compensated.

Another of the summands is preferably dependent on the power delivered and/or to be delivered by the wind onto the rotor and thus forms a power term which is preferably determined or co-determined by the power control means of the wind turbine. The power term describes in particular the "pitching" of the rotor blades and is thus also characteristic of normal operation of the wind turbine. This is desirable, because the wind turbine preferably continues to be operated during yawing. The rotation of the rotor blades to generate the aerodynamic loads is preferably superimposed, in particularly additively superimposed on the rotation of the rotor blades for controlling or regulating the power delivered by the wind onto the rotor. The total can comprise one or a plurality of additional summands which are used, for example, to correct one or a plurality of other disturbance variables.

The rotor preferably drives an electrical generator which generates electrical energy. This energy is preferably delivered to an electrical network.

The invention also relates to a wind turbine comprising a rotor which can be driven by wind, can rotate about a horizontally or substantially horizontally aligned rotor axis and comprises a plurality of rotor blades which each extend in the direction of a blade axis running transversely or substantially transversely to the rotor axis, a yaw angle adjusting drive by which the rotor can be rotated about a vertically or substantially vertically aligned yaw axis at a yaw angular velocity, gyroscopic loads being generated on the rotor blades due to the rotation of the rotor about the yaw axis, blade angle adjusting drives by which the rotor blades can be rotated about their blade axes, and a control means comprising the yaw angle adjusting drive and the blade angle adjusting drives and by which the gyroscopic loads on the rotor blades can be reduced due to rotation of the rotor blades about their blade axes subject to the yaw angular velocity or to a guide variable which influences said yaw angular velocity.

The wind turbine according to the invention can be developed in accordance with all configurations described in connection with the method of the invention. In particular, the method according to the invention is configured with the wind turbine according to the invention.

Gyroscopic loads, generated on the rotor blades by rotation of the rotor about the yaw axis can be reduced in particular by rotating the rotor blades about their blade axes subject to the yaw angular velocity or to the guide variable. This reduction can be performed in part or completely.

The yaw angular velocity can preferably be controlled or regulated by the control means subject to the guide variable.

According to a development of the invention, each rotor blade can be rotated about its blade axis by the control means additionally subject to an angle of rotation enclosed by the respective blade axis by a vertically or substantially vertically aligned straight line which in particular extends in the direction of the yaw axis, the control means comprising a rotation angle detection means which can detect the angle of rotation for at least one of the rotor blades. Since the angles enclosed by the rotor blades with one another around the rotor axis are usually fixed for the wind turbine, the detection of one angle of rotation is sufficient since it is possible to calculate the remaining angles of rotation therefrom. The rotor blades are preferably distributed uniformly around the rotor axis, so that starting from the detected angle of rotation $\beta_1$ for a first rotor blade, the angle of rotation $\beta_n$ for the nth rotor blade can be calculated using the formula $\beta_n = \beta_1 + (n-1)*360°/N$, where n is a natural number and N is the number of rotor blades. However, it is also possible to measure the angles of rotation for all the rotor blades. The rotation angle detection means preferably has at least one angle sensor which can detect the angle of rotation of at least one of the rotor blades.

Coupled with the rotor is preferably an electrical generator which can be driven by the rotor. The generator can generate electrical energy which can preferably be delivered to an electrical network.

The control means preferably comprises a power detection means which can detect or determine a power delivered by the wind onto the rotor, it being possible for the rotor blades to be rotated by the control means about their blade axes additionally subject to the power. The power detection means preferably comprises a wind speed sensor which can detect the wind speed in the region of the rotor. From the wind speed, it is possible to derive in particular the power which is delivered onto the rotor by the wind (aerodynamic power).

The control means preferably comprises a wind direction sensor which can detect the direction of the wind. In particular, the wind direction sensor can detect or determine the horizontal component of the wind direction. The wind direction sensor can be formed by the wind speed sensor or can be provided separately therefrom.

The control means preferably comprises a yaw angle sensor which can detect the yaw angle. The control means can thus calculate the yaw angle error from the wind direction or from the horizontal component thereof and from the yaw angle. In particular, the guide variable is determined by the control means subject to the yaw angle error.

The control means preferably comprises a yaw rate detection means which can detect or determine the yaw angular velocity. The yaw rate detection means can comprise the yaw angle sensor and, for example, can calculate the yaw angular velocity from a plurality of yaw angles detected at known times. In addition or alternatively, the yaw rate detection means comprises a yaw rate sensor which can detect the yaw angular velocity. In this case, the yaw rate detection means can be provided separately from the yaw angle sensor.

Rotations by the rotor blades about their blade axes can preferably be described in each case by a blade angle. According to a development of the invention, a desired blade angle which is dependent on the yaw angular velocity or on the guide variable can be determined by the control means for each rotor blade, and the blade angle for each rotor blade can be controlled or regulated by the control means depending on the respective desired blade angle. The control means preferably comprises blade angle sensors which can detect the blade angles.

According to a configuration of the invention, the control means comprises at least one blade angle control unit which can control the blade angle adjusting drives, and a yaw angle control unit which can control the yaw angle adjusting drive. In particular, the control means comprises a main control unit which can control the blade angle control unit and the yaw angle control unit. The blade angle adjusting drives, the yaw angle adjusting drive, the blade angle control unit, the yaw angle control unit and/or the main control unit can be arranged in different locations of the wind turbine.

The wind turbine preferably comprises a tower, a machine frame which is mounted on the tower such that it can rotate about the yaw axis, and a rotor shaft which is mounted on the machine frame such that it can rotate about the rotor axis and is rotationally engaged with a hub of the rotor on which the rotor blades are mounted such that they can rotate about their blade axes, the generator being coupled with the rotor shaft and being drivable by the rotor. The generator is preferably attached to the machine frame. The tower is positioned in particular on a foundation. The machine frame is preferably mounted on the tower on an upper end and/or on the end of the tower remote from the foundation such that it can rotate about the yaw axis.

To summarise, the invention relates to a wind turbine and to a method for controlling said wind turbine, gyroscopic loads generated by yawing being compensated. Consequently, a high yaw rate is possible so that the yaw angle error is reduced or eliminated. The yaw rate can be 4°/s and above.

Furthermore, the wind turbine can have a current, commercial design, without requiring relatively great changes to be made to the structure of the wind turbine (rotor blades, rotor, power train, machine frame, tower). It is possible to avoid an increase in damaging and undesirable blade loads.

According to a configuration of the method of the invention, the angle between the wind direction and the direction of the rotor axis or between the horizontal components of these directions are detected and are reduced by a procedure in which the yaw movement and the blade angle movement are coordinated with one another in time. According to a development of the method:

the main control unit delivers the set value for the yaw angular velocity substantially simultaneously to the yaw angle control unit and to the blade angle control unit, and/or using the set value for the yaw angular velocity, the wind conditions and the rotor position for each rotor blade, a schema for the blade angle adjustment is calculated so that the aerodynamic interaction between the wind and the rotor blades generates a load which counteracts the gyroscopic load caused by the yaw movement, and/or the set values and the measured values for the yaw rate and the blade angle adjusting rate and for the yaw angle and the blade angle are compared together, substantially in a continuous manner, and/or an error is detected (and, for example, an "error flag" is raised) if the difference between the set values and the measured values for the rates and/or for the angles exceeds a respectively predetermined level, and/or the yaw angular velocity is reduced to a value at which acceptable gyroscopic loads arise on the rotor blades without a compensating blade angle adjustment, and the compensation of the gyroscopic loads starts when an error has been detected (or if the "error flag" has been raised).

In particular, the invention provides the possibility of an increased energy consumption if the wind turbine is operated below the nominal speed, and/or allows a reduction in the rotor blade loads due to asymmetric wind conditions if the wind turbine is operated above the nominal speed, and/or allows an increased energy consumption without requiring the wind turbine to be redesigned, and/or allows an increased energy consumption, it being possible for the configuration of the method according to the invention to be easily implemented by means of the control logic of an existing wind turbine, and/or allows an increased energy consumption, it being possible for the control means according to the invention to be subsequently installed in an existing wind turbine, and/or allows an increased energy consumption by reducing the yaw angle error which is defined in particular as the angle between the wind direction and the direction of the rotor axis, and/or increases the yaw rate of the wind turbine without generating greater gyroscopic loads on the rotor blades, and/or allows a rapid yaw procedure with a yaw rate above 1°/s and preferably above 4°/s, without generating greater gyroscopic loads on the rotor blades and on the main power train of the wind turbine.

BRIEF DESCRIPTION OF DRAWINGS

In the following, the invention will be described on the basis of a preferred embodiment with reference to the drawings, in which:

FIG. 6 shows a coordinate system in which, according to a first simulation, the yaw angle of the wind turbine is plotted over time, FIG. 7 shows a coordinate system in which, according to the first simulation, the blade angle of a rotor blade of the wind turbine is plotted over time, FIG. 9 shows a coordinate system in which, according to another simulation, the impact moment on the root of the rotor blade is plotted.

DETAILED DESCRIPTION

Figure 1:
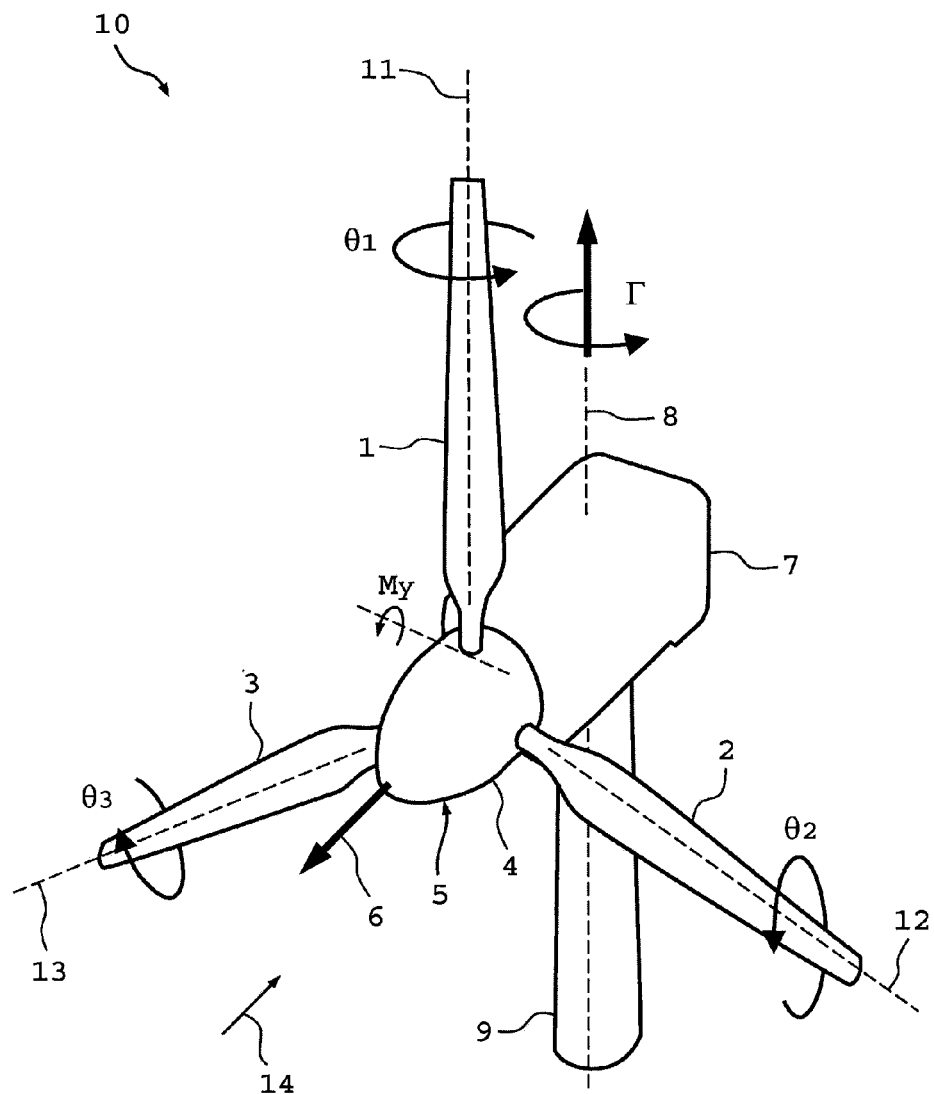
FIG. 1 is a perspective view of a wind turbine according to an embodiment of the invention.

FIG. 1 shows a wind turbine 10 with a rotor 5 which comprises three rotor blades 1, 2 and 3 and a hub 4 and is mounted on a machine frame 7 such that it can rotate about a rotor axis 6. The rotor blades 1, 2 and 3 are each mounted on the hub 4 such that they can rotate about a blade axis 11, 12 and 13 and extend away from the hub 4 in the direction of the blade axes. The blade axes 11, 12 and 13 extend transversely or substantially transversely to the rotor axis 6, the blade angles by which the rotor blades 1, 2 and 3 are rotated about their blade axes 11, 12 and 13 being denoted by $\theta_1$, $\theta_2$ and $\theta_3$. In general, the blade angle for the nth rotor blade is denoted by $\epsilon_n$, the index n characterising the respective rotor blade and, for the first rotor blade 1, it assumes the value n=1, for the second rotor blade 2, it assumes the value n=2 and for the third rotor blade 3, it assumes the value n=3. Although the number N of rotor blades is three in this case (N=3), as an alternative the number N of rotor blades can also be two or more than three.

Rotation of the rotor blades 1, 2 and 3 about their longitudinal axes changes the effective aerodynamic angles of incidence at which the wind 14 flows onto the rotor blades so that the power delivered onto the rotor 5 by the wind can be controlled or regulated by the rotation of the rotor blades about their blade axes. To rotate the rotor blades 1, 2 and 3 about their blade axes, blade angle adjusting drives 20, 21 and 22 are provided (see FIG. 5), it being possible for each rotor blade 1, 2 and 3 to be rotated individually about its axis by means of the respective blade angle adjusting drive 20, 21 and 22. Thus, the blade angle adjusting drives 20, 21 and 22 are part of an individual blade angle control means of the wind turbine.

The rotor 4, together with the machine frame 7, is mounted by a yaw mounting 34 (see FIG. 3) on an upper end of a tower 9 such that it can rotate about a vertically or substantially vertically aligned yaw axis 8, the yaw angle by which the rotor 5 together with the machine frame 7 is rotated about the yaw axis 8 with respect to the tower 9, being denoted by $\Gamma$. The temporal derivation of the yaw angle $\Gamma$ is known as the yaw angular velocity (yaw rate) $\gamma$ and is produced by $\gamma = d\Gamma/dt$. The yaw axis 8 extends in the direction of the longitudinal axis of the tower 9 and in particular coincides therewith. The rotation of the rotor 5 about the yaw axis 8, which is termed yawing or a yaw movement, takes place by means of a yaw angle adjusting drive 25 (see FIG. 5).

Figure 2:
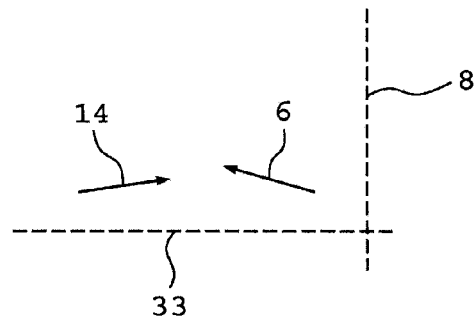
FIG. 2 is a schematic side view of the yaw axis and the rotor axis of the wind turbine and of the wind direction.

The rotor axis 6 is inclined slightly upwards relative to a horizontal or substantially horizontal plane 33, which can be seen in FIG. 2. The particular purpose of this inclination is to prevent collisions between the rotor blades 1, 2 and 3 and the tower 9, since the blades 1, 2 and 3 can bend resiliently under the influence of the wind. In practice, the inclination is preferably approximately 5° and is shown disproportionately in FIG. 2. The horizontal plane 33 extends in particular vertically to the yaw axis 8. Furthermore, the wind direction 14 can be inclined relative to the horizontal plane 33. Since the rotor 5 is rotated about the yaw axis 8 to track the wind, only the horizontal components of the rotor axis and of the wind direction are of interest here, which components are produced by the projection of the wind direction 14 and of the rotor axis 6 onto the horizontal plane 33.

Figure 3:
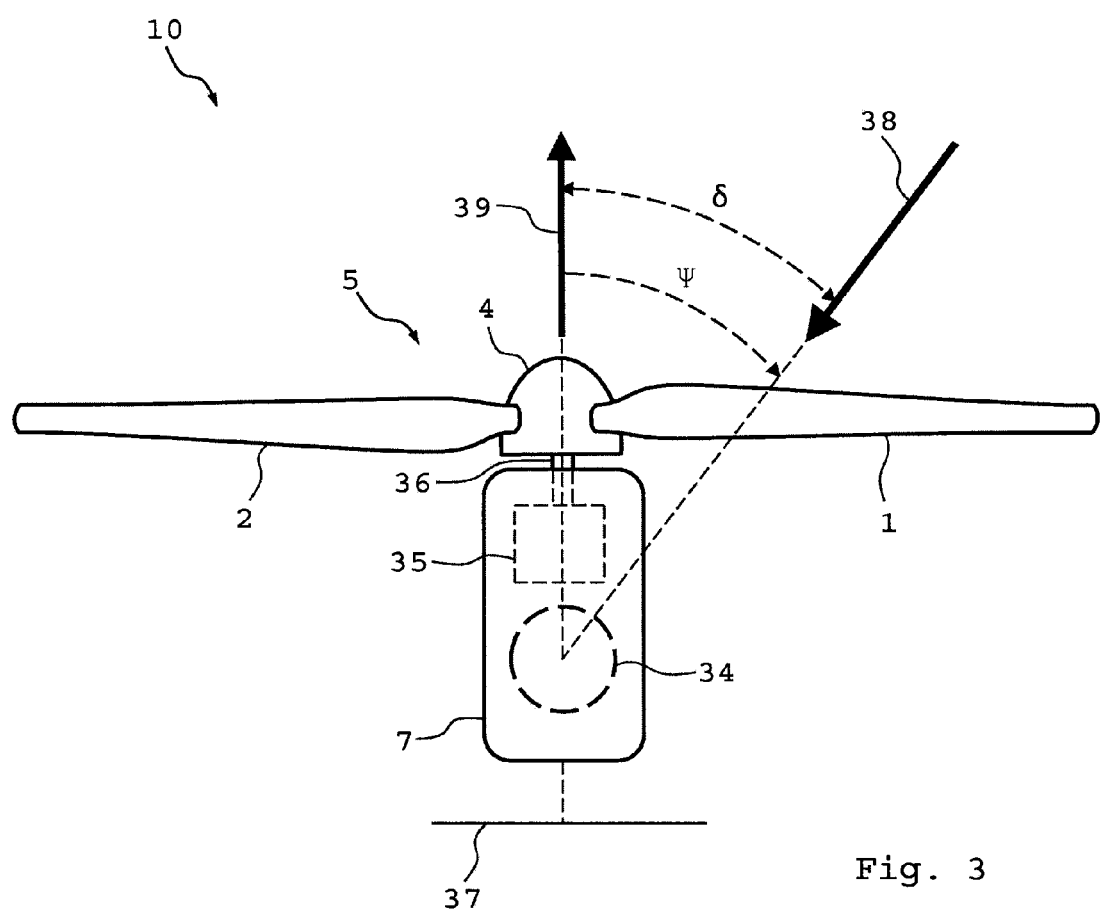
FIG. 3 is a plan view of the wind turbine.

FIG. 3 is a plan view of the wind turbine 10, the angle between the horizontal component of the wind direction 38 and the horizontal component of the rotor axis 39 being termed the yaw angle error .delta. In this figure, the horizontal plane 33 (shown in FIG. 2) is in the plane of the drawing. Under constant wind conditions, the yaw angle error .delta. can be reduced to zero by a suitable yaw movement of the rotor 5.

FIG. 3 also schematically shows the yaw mounting 34, an electrical generator 35 and a rotor shaft 36, by which the rotor 5 is mechanically coupled with the electrical generator 35. The generator 35 is attached to the machine frame 7 on which the rotor shaft 36 is mounted such that it can rotate about the rotor axis 6. In this case, the generator 35 is driven directly by the rotor shaft 36 and it generates electrical energy which is delivered to an electrical network 37. Alternatively however, a transmission can also be connected between the rotor shaft 36 and the generator 35.

Figure 4:
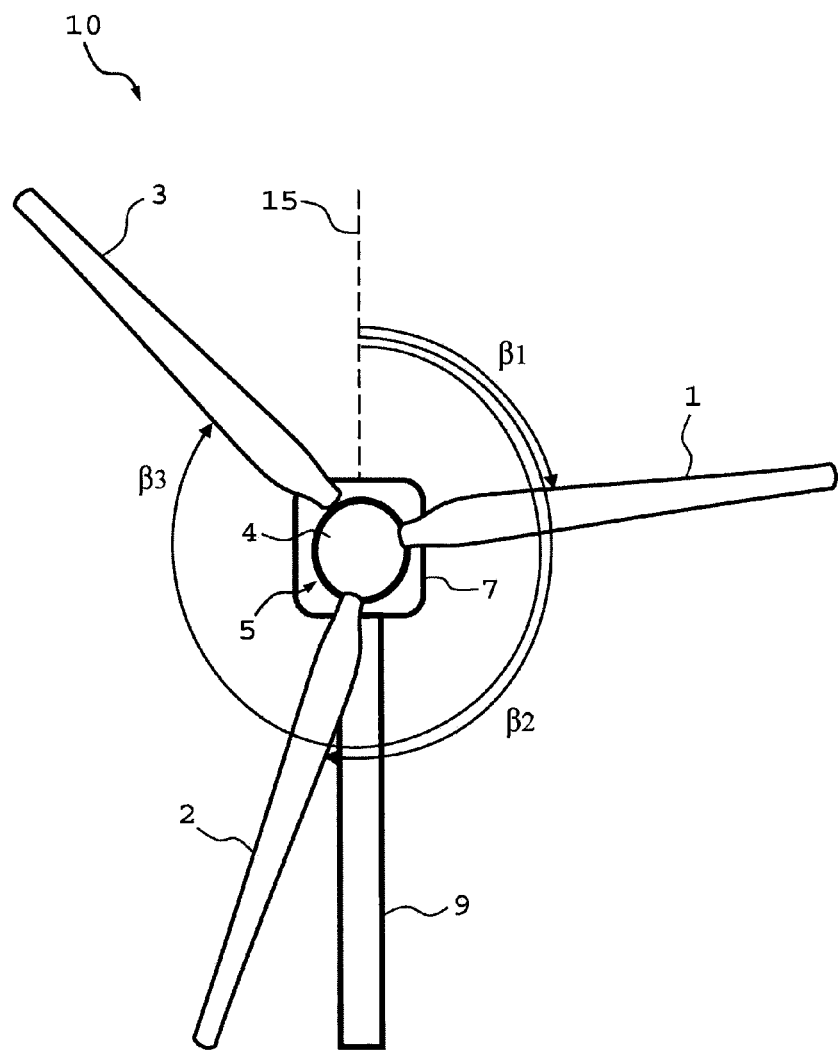
FIG. 4 is a front view of the wind turbine.

FIG. 4 is a front view of the wind turbine 10 showing the angles of rotation $\beta_1$, $\beta_2$ and $\beta_3$, enclosed by the rotor blades 1, 2 and 3 by a vertically or substantially vertically aligned straight line 15. In general, the angle of rotation for the nth rotor blade is denoted by $\beta_n$, the index n characterising the respective rotor blade. The straight line 15 extends in particular in the direction of the yaw axis 8. Since the rotor blades 1, 2 and 3 enclose fixed angles with one another around the rotor axis 6, it is sufficient to measure one of the angles of rotation. The other angles of rotation can then be determined by a calculation. If the angle of rotation $\beta_1$ is measured for the first rotor blade 1, the angle of rotation $\beta_2$ for the second rotor blade is calculated as $\beta_2=\beta_1+2\pi/3$ and the angle of rotation $\beta_3$ for the third rotor blade is calculated as $\beta_3=\beta_1+4\pi/3$, the angles being given here as radians. The temporal derivation of the angle of rotation $\beta_1$ is termed the rotation angle velocity $\omega$ and is calculated as $\omega=d\beta_1/dt$. The rotation angle velocity is the same for all rotor blades and describes the angular velocity at which the rotor 5 rotates about the rotor axis 6.

Figure 5:
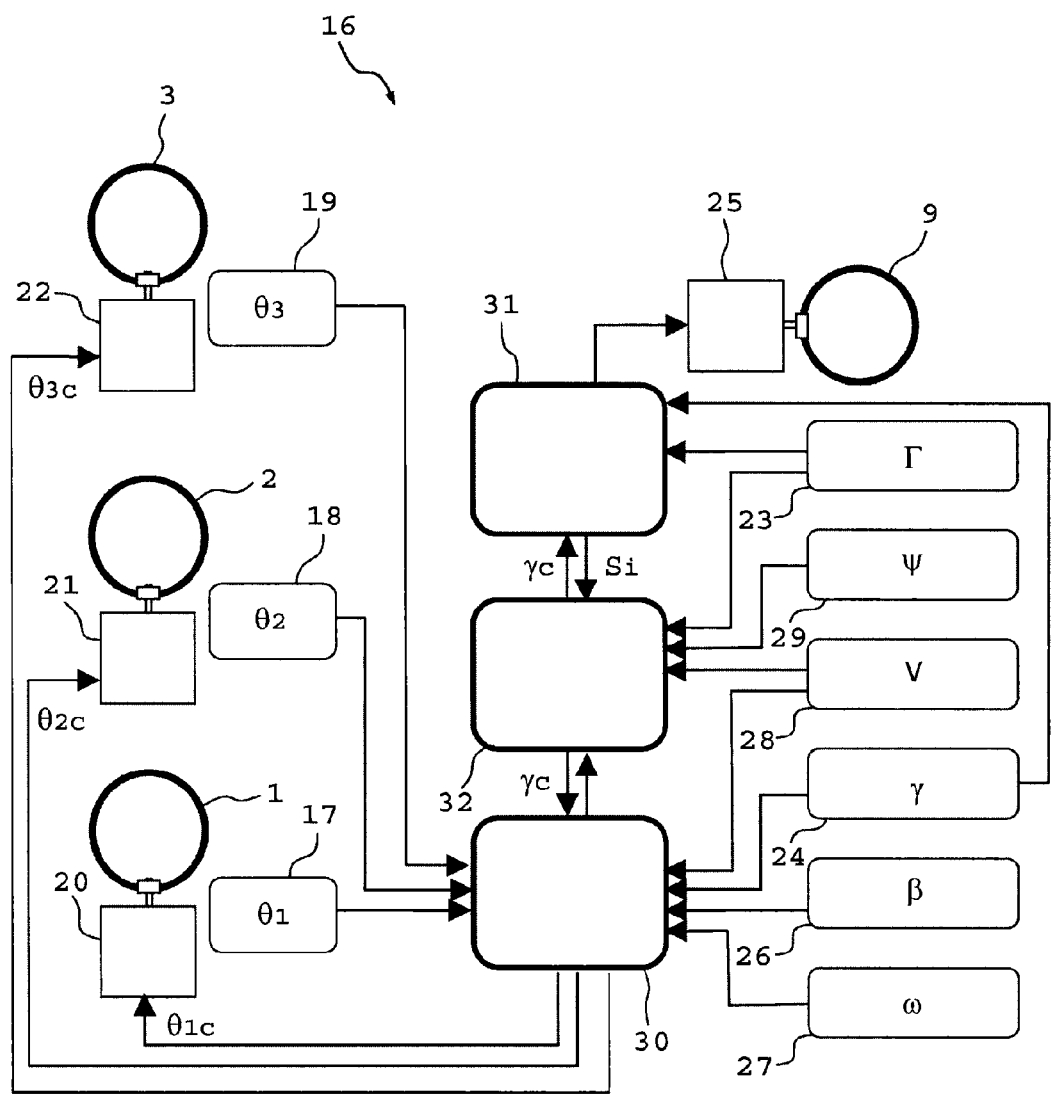
FIG. 5 is a block diagram of a control means of the wind turbine.

FIG. 5 shows a schematic block diagram of a control means 16 of the wind turbine 10. The control means 16 comprises a blade angle sensor 17 which can detect the blade angle $\theta_1$ of rotor blade 1, a blade angle sensor 18 which can detect the blade angle $\theta_2$ of rotor blade 2, a blade angle sensor 19 which can detect the blade angle $\theta_3$ of rotor blade 3, a blade angle adjusting drive 20 which can rotate rotor blade 1 about its blade axis 11, a blade angle adjusting drive 21 which can rotate rotor blade 2 about its blade axis 12, a blade angle adjusting drive 22 which can rotate rotor blade 3 about its blade axis 13, a yaw angle sensor 23 which can detect the yaw angle $\Gamma$, a yaw rate sensor 24 which can detect the yaw angular velocity $\gamma$, the yaw angle adjusting drive 25 which can rotate the rotor 5 about the yaw axis 8, a rotational angle sensor 26 which can detect the angle of rotation $\beta_1$ of the first rotor blade 1, a rotation angle velocity sensor 27 which can detect the angular velocity $\omega$ at which the rotor 5 rotates about the rotor axis 6, a wind speed sensor 28 which can detect the wind speed V, a wind direction sensor 29 which can detect an angle $\psi$ which describes the horizontal component of the wind direction, a blade angle control unit 30 which can control the blade angle adjusting drives 20, 21, 22, a yaw angle control unit 31 which can control the yaw angle adjusting drive 25 and a main control unit 32 which can activate the blade angle control unit 30 and the yaw angle control unit 31.

The wind turbine 10 is controlled in a superordinated manner by the main control unit 32. This unit communicates in a bidirectional manner with the blade angle control unit and with the yaw angle control unit 31. The control units can be constructed by the same circuit (hardware) or by separate circuits. Furthermore, the control units can be arranged in a common housing or in separate housings.

An index "c" distinguishes set values determined and/or delivered by the control units from measured values which are recorded by the sensors. For example, $\gamma c$ denotes a set value for the yaw rate, while $\gamma$ denotes the measured yaw rate. The yaw angular velocity of the rotor 5 with a rotation about the yaw axis 8 is termed the yaw rate.

The main control unit 32 sends as an instruction a yaw rate set value $\gamma c$ to the yaw angle control unit 31 and receives therefrom status information $S_i$ about the status of the implementation of this instruction. In turn, the yaw angle control unit 31 controls the yaw angle adjusting drive 25 and checks whether the measured yaw rate $\gamma$ agrees with the yaw rate set value $\gamma c$.

The main control unit 32 communicates with the blade angle control unit 30 to regulate the aerodynamic power delivered onto the rotor 5 by the wind and to check the status of the implementation of instructions concerning the blade angles $\theta_n$. Furthermore, the main control unit 32 can communicate with the blade angle control unit 30 for other purposes which are known from the prior art. In this respect, a set value, used for regulating the power or for regulating the power among other things, for the blade angle $\theta_n$ of the nth rotor blade is denoted by $\theta_{ncp}$.

The sensors send information to the control units to control the wind turbine 10. The main control unit 32 receives the yaw angle $\Gamma$ from the yaw angle sensor 23 and the angle $\psi$, describing the wind direction, from the wind direction sensor 29 and calculates therefrom the yaw angle error $\delta$, where $\delta=\psi-\Gamma$. The main control unit 32 also receives from the wind speed sensor 28 the wind speed V, from which the aerodynamic power can be derived.

The blade angle control unit 30 receives the current blade angle $\theta_n$ for each rotor blade 1, 2 and 3 from the blade angle sensors 17, 18 and 19, so that the blade angle control unit 30 can monitor instructions given to the blade angle adjusting drives 20, 21 and 22 about values to be set for the blade angles $\theta_{nc}$ to check whether they are implemented within predetermined tolerances. Furthermore, the blade angle control unit 30 receives from the sensors 28, 24, 26 and 27 the wind speed V, the yaw rate $\gamma$, the angle of rotation $\beta_1$ of the first rotor blade 1 and the angular velocity $\omega$ of the rotor 5 in order to calculate the desired blade angle $\theta_{nc}$ for each rotor blade.

The control means 16, in particular the main control unit monitors the yaw angle error $\delta$ and, to reduce this error, initiates a rapid yaw procedure if the yaw angle error $\delta$ is considered to be too great. The condition for "too great" can be defined, for example by a function of the current yaw angle error $\delta$, of a yaw angle error averaged over a predetermined period of time, of a temporal change in the yaw angle error (for example yaw angle error rate) and/or of the current yaw rate of the rotor 5.

The rapid yaw procedure is initiated by the calculation of a set value for the yaw rate $\gamma c$. In particular, for an almost optimum yaw angle error minimisation, the set value of the yaw rate is substantially proportional to the yaw angle error rate $d\delta/dt$, which corresponds to the temporal derivation of the yaw angle error $\delta$. The set value of the yaw rate is restricted by a maximally admissible yaw rate $\gamma_{max}$ which is compatible with power characteristics of the yaw and blade angle adjusting drives.

The set value of the yaw rate $\gamma_c$ is transmitted to the yaw control unit 31 and simultaneously or substantially simultaneously to the blade angle control unit 30. The blade angle control unit 30 can activate each rotor blade individually and is responsible for the rotation of each rotor blade about its blade axis. When the rapid yaw procedure commences, the set value of the yaw rate $\gamma_c$ is increased smoothly from 0 to the calculated value, thereby avoiding jerky loads on the yaw angle adjusting drive 25. During the rapid yaw procedure, the set value of the yaw rate $\gamma_c$ is modified, preferably continuously, so that the rotor 5 follows changes in wind direction.

The simultaneous transmission of information about the start of the yaw activity and of the set value of the yaw rate $\gamma_c$ to the yaw control unit 31 and to the blade angle control unit 30 allows these units to synchronise in time the implementation of a compensating blade angle adjusting procedure with the occurrence of gyroscopic loads, so that these loads are partly or completely compensated. In this respect, the desired blade angle $\theta_{nc}$ for the nth rotor blade is described by a function which essentially has the following form:

$$\theta_{nc}=\theta_{ncp}+\gamma_c*G*\cos(\beta_n+\Phi), \text{ where} \qquad (1)$$

$\theta_{nc}$ is the desired blade angle for rotor blade n
$\theta_{ncp}$ is the desired blade angle for rotor blade n without compensation of gyroscopic loads
$\gamma_c$ is the set value of the yaw rate
G is gain
$\beta_n$ is the measured, current angle of rotation of rotor blade n
$\Phi$ is the phase shift.

The desired blade angle $\theta_{nc}$ is formed from a total, a first summand "$\theta_{ncp}$" corresponding to the total of a desired blade angle without compensation of gyroscopic loads, as formed in the case of a conventional wind turbine in "normal" operation, and the second summand of the total "$\gamma_c*G*\cos(\beta_n+\Phi)$" causing the compensation of the gyroscopic loads. Therefore, the second summand produces a desired blade angle $\theta_{nc}$ which changes cyclically with the angle of rotation $\beta_n$ of the respective rotor blade.

If the gain G is kept constant, the second summand is proportional to the set value for the yaw rate $\gamma_c$. Furthermore, the gyroscopic loads are proportional to the measured yaw rate $\gamma_c$. The gain G and the phase shift $\Phi$ are then selected such that the gyroscopic loads engaging on the rotor blades are reduced to a desired extent.

The desired extent to which the gyroscopic loads are reduced does not necessarily result in the greatest possible reduction of the gyroscopic loads. The desired extent can merely result in a partial reduction of the gyroscopic loads, in particular if the remaining gyroscopic loads are in keeping with admissible loads on the rotor blades. Thus, the remaining gyroscopic loads do not shorten the expected service life of components of the wind turbine. Since losses are associated with the reduction in the gyroscopic loads, which losses increase in particular as the reduction increases, generally with a partial reduction in the gyroscopic loads, the energy yield of the wind turbine is greater than when the gyroscopic loads are minimised or completely eliminated.

Therefore, the gyroscopic loads are preferably only partly reduced, so that remaining gyroscopic loads are in the region of admissible loads on the rotor blades. The extent to which the gyroscopic loads are reduced is also termed the optimum extent, because this extent forms in particular an optimum in respect of the desire for a reduction in the gyroscopic loads on the one hand and in respect of the desire for a maximum energy yield on the other. Thus, the admissible loads are preferably maximally admissible loads.

Influencing factors which determine the optimum extent are, for example, characteristics of the rotor blades and of other components of the wind turbine as well as the costs thereof, wind conditions expected for the wind turbine, including turbulence, and expected yaw activities. If the influencing factors which determine the optimum extent are known, then said optimum extent can be determined using standard optimising routines known in the prior art.

Figure 10:
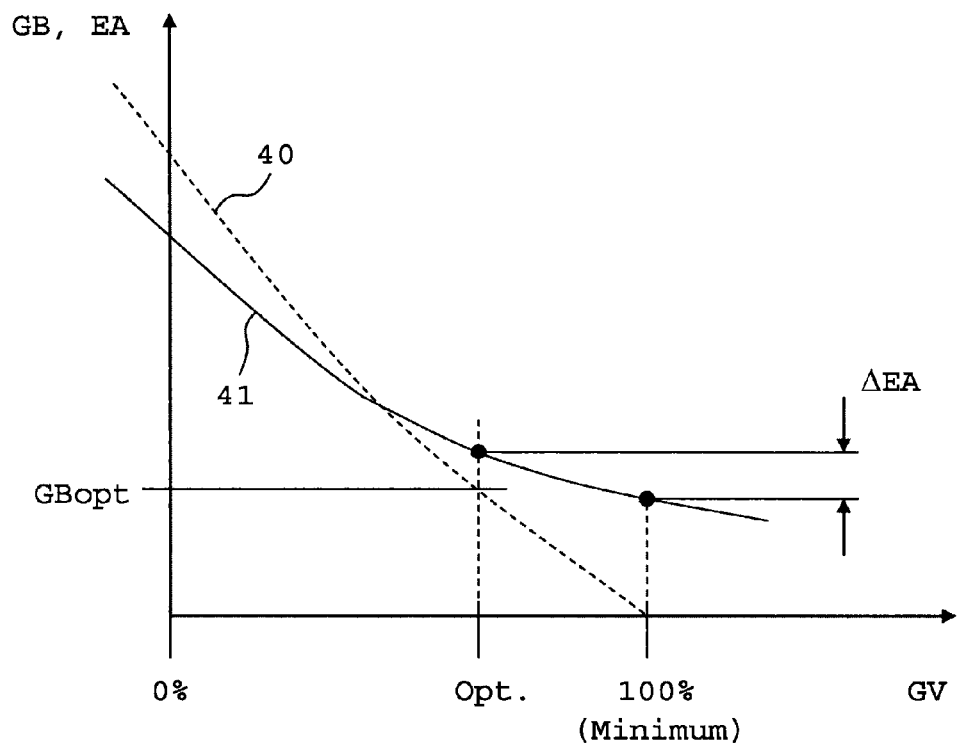
FIG. 10 shows a coordinate system in which the gyroscopic loads arising during a rapid yaw procedure and the energy yield are plotted over the losses associated with the reduction in the gyroscopic loads.

FIG. 10 shows a coordinate system in which the gyroscopic loads GB are plotted schematically over the losses GV associated with the reduction in the gyroscopic load during a rapid yaw procedure with a yaw rate of, for example, 5°/s, the associated graph being termed a load curve 40 (shown in dashed lines). Furthermore, in the coordinate system, the energy yield EA is plotted schematically over the losses GV during the rapid yaw procedure, the associated graph being termed an energy curve 41 (solid line). The value GBopt on the ordinate identifies a gyroscopic load which corresponds to an admissible load on the rotor blades, the associated value being denoted by Opt. on the abscissa. In particular, values of GB which are above GBopt lead to inadmissibly high loads, so that in this sense GBopt represents a maximally admissible load. At the point where the load curve 40 intersects the abscissa, the gyroscopic load is minimal (minimum), the associated value being denoted on the abscissa by 100% and forming in particular a maximum value for GV. The difference between the ordinate values of the energy curve which are associated with the loss values Opt. and 100% is denoted by $\Delta EA$. If the gyroscopic loads are only partly reduced, and preferably to GBopt, then an energy yield increased by $\Delta EA$ is produced with respect to a minimisation of the gyroscopic loads. Thus, the load value GBopt preferably corresponds to the optimum extent.

Accordingly, a partial reduction in the gyroscopic loads allows an increased energy consumption, in particular under turbulent wind conditions which require, for example, a constant yaw movement. Therefore, the gain G and the phase shift $\Phi$ are preferably selected such that the gyroscopic loads engaging on the rotor blades are reduced to the optimum extent. Nevertheless, the possibility of reducing the gyroscopic loads to a minimum extent should not be ruled out.

Since aerodynamic loads are used to compensate the gyroscopic loads, the desired values for G and $\Phi$ vary both with the wind conditions and with the operating status of the wind turbine (for example rotational speed of rotor, yaw angle error, etc.). In addition, the values for G and $\Phi$ depend on the aerodynamic characteristics of the rotor blades, such as the coefficient of lift and the angle of incidence when a stall occurs, and also on the structural characteristics of the wind turbine, such as the inertia of the rotor blades. If these characteristics vary from one rotor blade to another, G and $\Phi$ also vary from one rotor blade to another. In particular, the values for G and $\Phi$ depend on the rotor rotational speed or rotor angular velocity $\omega$ and/or on the wind speed V and/or on the angle of rotation $\beta_n$ for the respective rotor blade n.

Suitable values for G and $\Phi$ for varying wind and wind turbine conditions are preferably stored in a memory, in particular in table form. For this purpose, suitable values for G and $\Phi$ under known wind and wind turbine conditions are determined and are stored as a function of these conditions in table form in a memory module. It is therefore possible to determine the values for G and $\Phi$ under current wind and wind turbine conditions by reading out appropriate values from the table. This determination can either be performed by reading out and using the values for G and $\Phi$ which most closely fit the current wind and wind turbine conditions, or by obtaining the values for G and $\Phi$ subject to the current conditions using a linear interpolation method or another suitable interpolation method. Since intermediate values can be formed as a result of the interpolation, the use of an interpolation method is preferred, suitable interpolation methods being known from the prior art.

The above-mentioned wind and wind turbine conditions include in particular the rotor angular velocity ω, the wind speed V, the yaw angle error δ as well as the admissible blade root load on the respective rotor blade. The admissible blade root load includes a static proportion and/or a dynamic proportion, dynamic blade root loads in particular contributing to the material fatigue of components of the wind turbine.

The stored values for G and Φ are preferably determined by a numerical simulation of the wind turbine using controlled wind conditions. All relevant conditions, the occurrence of which is expected during operation of the wind turbine, are preferably used to produce the table. In this respect, the wind and wind turbine conditions are selected such that the actual variation range thereof is covered as completely as possible.

The control means 16, in particular the main control unit 32 monitors, for example based on the status information $S_i$, the difference between the set value of the yaw rate $γ_c$ and the current yaw rate γ during the rapid yaw procedure. This difference will not usually be zero due to adjusting movement errors and to a greater extent, due to disturbance movements which are superimposed on the adjusting movements and are caused by turbulence and by asymmetric wind movements on the rotor 5.

However, the difference between the set value of the yaw rate $γ_c$ and the current yaw rate γ is negligible if this difference is below a predetermined threshold. The interpretation of differences above the threshold is that there is an error in the yaw system so that the set value for the yaw rate is reduced to a value at which compensation of the gyroscopic loads is no longer necessary. The compensation of gyroscopic loads is disconnected at the same time. For example, the set value for the yaw rate is reduced to a value of less than 0.7°/s which is usual for the yaw of a conventional wind turbine without compensation of gyroscopic loads.

However, if the difference between the set value of the yaw rate $γ_c$ and the current yaw rate γ is small, to compensate the gyroscopic loads, both the set value of the yaw rate $γ_c$ and the current yaw rate γ can be used in order to successfully carry out a rapid yaw procedure. In this case, in equation (1) the set value of the yaw rate $γ_c$ can be replaced by the measured current yaw rate γ, so that the second summand is proportional to the yaw rate γ.

The control means 16, in particular the main control unit 32 also monitors, for example based on status information supplied by the blade angle control unit 30, the difference between a current blade angle rate (dθn/dt) which corresponds to the temporal derivation of the respective blade angle θn, and a set value for the blade angle rate during the rapid yaw procedure for each rotor blade. If this difference exceeds a predetermined threshold, the rapid yaw procedure is interrupted and the set value for the yaw rate is reduced to a value at which compensation of the gyroscopic loads is no longer necessary. For example, the yaw procedure is continued with a conventional yaw rate of less than 0.7°/s.

Referring to FIG. 6 to 9, four simulations S1, S2, S3 and S4 of a rapid yaw procedure are described which were carried out for a wind turbine according to the invention. The wind turbine used can be, for example a turbine of the NREL 1.5 MW baseline turbine type as described in the document NREL/SR-500-32495, "WindPACT Turbine Rotor Design Study" by D. J. Malcolm and A. C. Hansen (2002), where this turbine is to be modified in the manner of the invention.

FIG. 6 shows a coordinate system in which the yaw angle Γ (yaw position) is plotted over time t. The yaw angle is given in degrees (deg) and the time is given in seconds (sec). The yaw angle Γ according to FIG. 6 is modified for the simulations S1, S2, S3 and S4 of a rapid yaw procedure.

FIG. 7 shows a coordinate system in which the blade angle $β_1$ for the first rotor blade 1 (Blade-1 Pitch) is plotted over time t during the first simulation S1. The blade angle is given in degrees (deg) and the time is given in seconds (sec).

According to FIGS. 6 and 7, the yaw angle Γ is altered for a period of 10 s at a rate of 5°/s, which results in an overall change in yaw angle of 50°. The wind speed V is kept constant at 7 m/s, while the wind direction changes in the same manner as the yaw angle Γ of the wind turbine, so that during the simulation, the yaw angle error δ remains at zero (i.e. δ=0). This relationship between wind direction and yaw angle represents the limiting case of a perfect wind tracking. The control of the blade angle operates with a gain G of 1.25 s and with a phase Φ of −20°, thus producing a desired blade angle $θ_{nc}$ with a maximum desired blade angle rate $dθ_{nc}/dt$ of less than 10°/s, which is compatible with power ratings of blade angle adjusting drives which are currently available on the market. According to FIG. 7, the maximum blade angle rate $dθ_1/dt$ is 10.2°/s (10.2 deg/s max.). The rotor angular velocity ω is, for example approximately 18/s.

Figure 8:
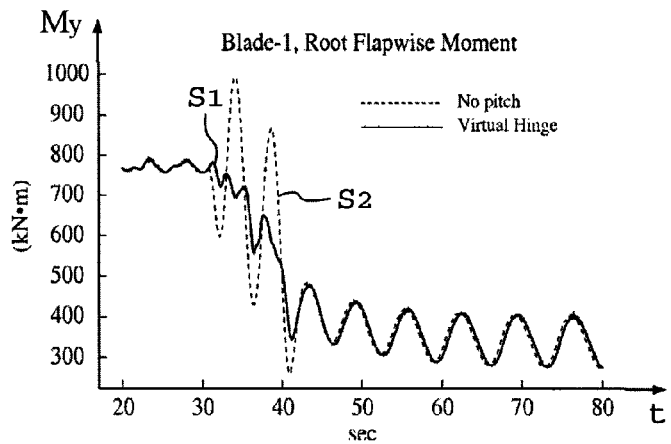
FIG. 8 shows a coordinate system in which, according to the first simulation, the impact moment on the root of the rotor blade is plotted.

FIG. 8 shows a coordinate system in which the impact moment $M_y$, occurring on the blade root, for the first rotor blade (Blade-1, Root Flapwise Moment) is plotted over time t with a solid line during the first simulation S1 and is plotted with a dashed line during the second simulation S2. The impact moment is given in kNm and the time is given in seconds (sec). According to the first simulation S1, a blade angle adjustment is made to compensate gyroscopic loads, whereas according to the second simulation S2, no compensation of the gyroscopic loads takes place (no pitch). The rotor axis 6 is aligned in the wind direction 14 so that a yaw angle error δ does not occur.

The large vibrations, illustrated by the dashed line (simulation 2, without compensation of gyroscopic loads) can damage the wind turbine and are thus inadmissible.

According to the solid line (simulation S1, with activated compensation of the gyroscopic loads), the impact moment is merely subject to vibrations which also occur during operation without yaw movement, so that the rapid yaw procedure is possible without structural changes being made to the rotor blade or to the power train of the wind turbine. According to a simplified modelling, the compensation of gyroscopic loads with respect to the impact moment acts like a virtual hinge which, however, is only to be understood as an example.

FIG. 9 shows a coordinate system in which the impact moment $M_y$, occurring on the blade root, for the first rotor blade is plotted over time t during the third simulation S3 with a solid line and is plotted during the fourth simulation S4 with a dashed line. According to the third simulation S3, a blade angle adjustment is carried out to compensate gyroscopic loads, whereas according to the fourth simulation S4, the compensation of the gyroscopic loads is disconnected. According to FIG. 8, the wind direction 14 is constant, so that the yaw angle error δ increases to a maximum value.

According to FIG. 6, the rotor 5 yaws, the wind direction being kept constant. In this case, the yaw angle error δ is equal to the yaw angle Γ, which represents the limiting case of an incomplete wind tracking. The large vibrations, illustrated by the dashed line (simulation 4, without compensation of gyroscopic loads) are inadmissible.

The vibration proportion of the impact moment $M_y$, which can be seen at approximately 60 s in the case of the activated compensation of the gyroscopic loads (simulation S3, solid line) is caused by the increasingly large yaw angle error under which the wind turbine operates. After the conclusion of the rapid yaw procedure, the yaw angle error is at a maximum at 60 seconds. To lower this vibration proportion, it is possible to use an individual blade angle control logic to reduce blade loads caused by yaw angle errors. A blade angle control logic of this type is known from the prior art for a non-yawing rotor. The blade angle adjustment according to the invention for compensating gyroscopic loads can preferably also be used together with other known blade angle control strategies for individual or joint blade angle control.

The invention claimed is:

1. A method for controlling a wind turbine comprising a rotor which can be driven by wind, can rotate about a horizontally or substantially horizontally aligned rotor axis and comprises a plurality of rotor blades which each extend in the direction of a blade axis running transversely or substantially transversely to the rotor axis about which the respective rotor blade is rotated, the rotor being rotated about a vertically or substantially vertically aligned yaw axis, at a yaw angular velocity, as a result of which gyroscopic loads are generated on the rotor blades, and wherein the method comprises:
   using a blade angle control unit to rotate the rotor blades about their blade axes subject to at least one of:
       the yaw angular velocity, or
       to a guide variable relating to at least one of a yaw angle error or yaw angle error rate relating to said yaw angular velocity, which reduces the gyroscopic loads on the rotor blades; and
   receiving status information from the blade angle control unit to monitor adjustment of the rotor blades about their blade axes during a yaw adjustment operation, and interrupting the yaw adjustment operation if the status information indicates that a difference between a current blade angle rate of change and a set value for blade angle rate exceeds a predetermined threshold.

2. The method according to claim 1, wherein the yaw angular velocity is controlled or regulated subject to the guide variable.

3. The method according to claim 1, wherein each rotor blade is rotated about its blade axis additionally subject to an angle of rotation enclosed by the respective blade axis by a vertically or substantially vertically aligned straight line.

4. The method according to claim 3, wherein each rotor blade is rotated about its blade axis subject to the sine or cosine of an angle which is equal to the respective angle of rotation or is equal to a total of the respective angle of rotation and a phase shift for the respective rotor blade.

5. The method according to claim 1, wherein the rotor blades are rotated about their blade axes additionally subject to a power which is delivered by the wind onto the rotor.

6. The method according to claim 1, wherein the yaw angular velocity is measured or is determined based on a measurement of the rotational movement of the rotor about the yaw axis.

7. The method according to claim 1, wherein rotations of the rotor blades about their blade axes are described in each case by a blade angle in that a desired blade angle which is subject to the yaw angular velocity or to the guide variable, is determined for each rotor blade in that the blade angle for each rotor blade is controlled or regulated subject to the respective desired blade angle.

8. The method according to claim 7, wherein each desired blade angle is linearly dependent on the yaw angular velocity or on the guide variable.

9. The method according to claim 8, wherein each of the desired blade angles is formed by a total of a plurality of summands, one of which is dependent on the yaw angular velocity or on the guide variable.

10. The method according to claim 9, wherein the rotor blades are rotated about their blade axes additionally subject to a power which is delivered by the wind onto the rotor, and wherein another of the summands is dependent on the power.

11. The method according to claim 9, wherein each rotor blade is rotated about its blade axis additionally subject to an angle of rotation enclosed by the respective blade axis by a vertically or substantially vertically aligned straight line, and wherein the one summand dependent on the yaw angular velocity or on the guide variable changes cyclically with the angle of rotation of the respective rotor blade.

12. A wind turbine comprising:
   a rotor which can be driven by wind, and which rotates about a horizontally or substantially horizontally aligned rotor axis and comprises a plurality of rotor blades which each extend in the direction of a blade axis running transversely or substantially transversely to the rotor axis,
   a yaw angle adjusting drive by which the rotor can be rotated about a vertically or substantially vertically aligned yaw axis at a yaw angular velocity, and wherein gyroscopic loads are generated on the rotor blades due to the rotation of the rotor about the yaw axis,
   a plurality of blade angle adjusting drives by which the rotor blades each can be rotated about their respective blade axes,
   a control means including the yaw angle adjusting drive and the blade angle adjusting drives, by which the gyroscopic loads on the rotor blades can be reduced due to rotation of the rotor blades about their respective blade axes subject to the yaw angular velocity or to a guide variable, the guide variable being a set value for said yaw angular velocity; and
   the control means further including a control unit configured to receive and monitor status information relating to blade angle adjustments made during a yaw adjustment operation and to interrupt the yaw adjustment operation if the status information indicates that a difference between a current blade angle rate of change and a set value for blade angle rate exceeds a predetermined threshold.

13. The wind turbine according to claim 12, wherein the yaw angular velocity can be controlled or regulated by the control means subject to the guide variable.

14. The wind turbine according to claim 12, wherein each rotor blade can be rotated about its blade axis by the control means additionally subject to an angle of rotation enclosed by the respective blade axis by a vertically or substantially vertically aligned straight line, the control means further including a rotation angle detection means which can detect the angle of rotation for at least one of the rotor blades.

15. The wind turbine according to claim 14, wherein each rotor blade is rotated about its blade axis subject to the sine or cosine of an angle which is equal to the respective angle of rotation or is equal to a total of the respective angle of rotation and a phase shift for the respective rotor blade.

16. The wind turbine according to claim 12, wherein the control means further comprises a power detection means which can determine a power delivered by the wind onto the rotor, it being possible for the rotor blades to be rotated by the control means about their blade axes additionally subject to the power.

17. The wind turbine according to claim 12, wherein the control means further comprises a yaw rate detection means which can detect or determine the yaw angular velocity.

18. The wind turbine according to claim 12, wherein rotations of the rotor blades about their blade axes can be described in each case by a blade angle, in that a desired blade angle which is dependent on the yaw angular velocity or on the guide variable can be determined by the control means for each rotor blade, and in that the blade angle, for each rotor blade, can be controlled or regulated by the control means depending on the respective desired blade angle.

19. The wind turbine according to claim 18, wherein each rotor blade can be rotated about its blade axis by the control means additionally subject to an angle of rotation enclosed by the respective blade axis by a vertically or substantially vertically aligned straight line, the control means further including a rotation angle detection means which can detect the angle of rotation for at least one of the rotor blades, and wherein each of the desired blade angles is formed by a total of a plurality of summands which form different variables relating to wind turbine operation, one of said plurality of summands being dependent on the yaw angular velocity or on the guide variable, and changes cyclically with the angle of rotation of the respective rotor blade.

20. The wind turbine according to claim 19, wherein the control means further comprises a power detection means for sensing power delivered by the wind onto the rotor, it being possible for the rotor blades to be rotated by the control means about their blade axes additionally subject to the power, and wherein another one of the plurality of summands is dependent on the power.

21. The wind turbine according to claim 19, wherein the one of the plurality of summands which is dependent on the yaw angular velocity or on the guide variable, varies with the rotational speed of the rotor.

22. The wind turbine according to claim 12, further comprising a tower, a machine frame which is mounted on the tower such that it can rotate about the yaw axis, a rotor shaft which is mounted on the machine frame such that it can rotate about the rotor axis and is rotationally engaged with a hub of the rotor on which the rotor blades are mounted such that they can rotate about their blade axes and an electrical generator which is attached to the machine frame, is coupled with the rotor shaft and can be driven by the rotor.

* * * * *